Jan. 20, 1948. H. E. KRUEGER 2,434,661
CENTERING GAUGE FOR SETTING UP WORK IN BALANCING MACHINES
Filed Nov. 25, 1942 2 Sheets-Sheet 2

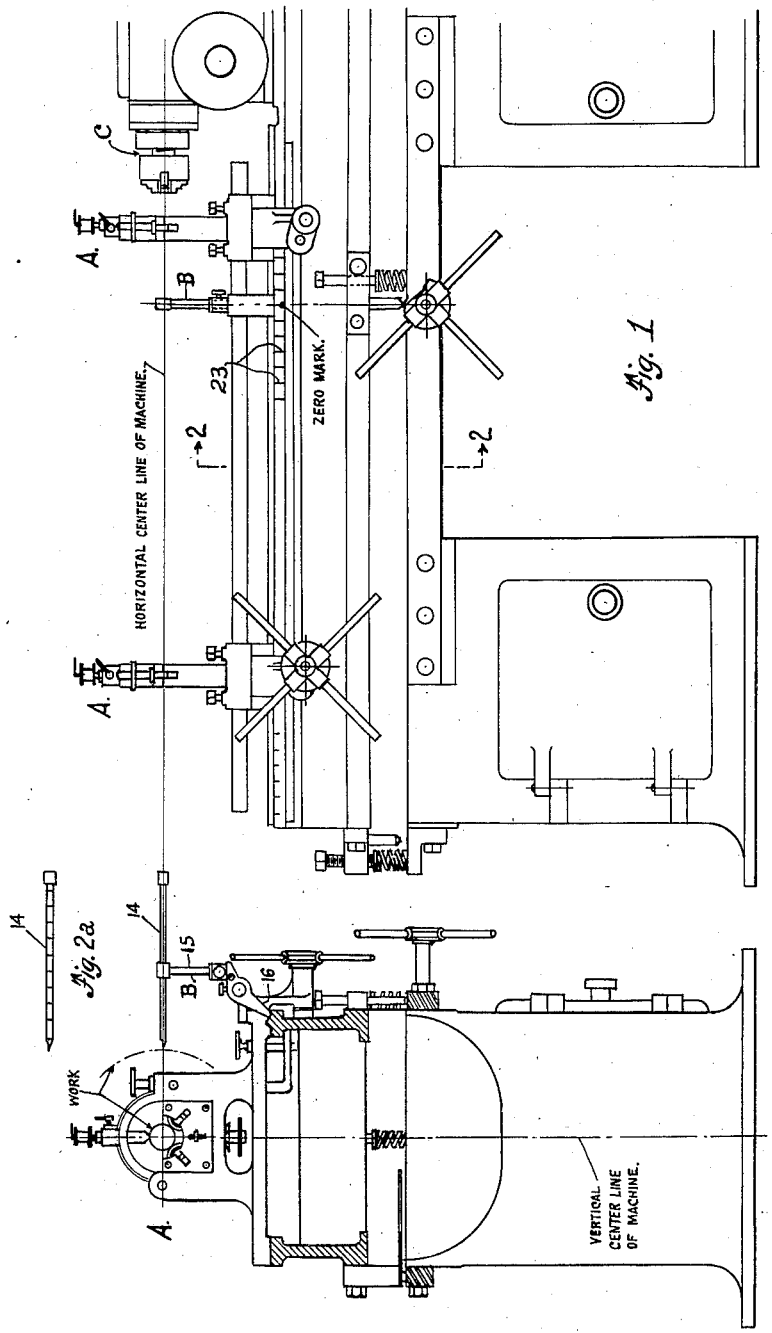

Inventor
HERBERT E. KRUEGER
By M. O. Hayes
Attorney

UNITED STATES PATENT OFFICE 2,434,661

CENTERING GAUGE FOR SETTING UP WORK IN BALANCING MACHINES

Herbert E. Krueger, Vallejo, Calif.

Application November 25, 1942, Serial No. 466,947

1 Claim. (Cl. 33—180)

(Granted under the act of March 3, 1883, as amended April 30, 1928; 370 O. G. 757)

This invention relates to work-centering devices and other accessories on balancing machines.

In testing crank shafts and other rotatable parts for balance, the part is usually mounted to rotate in a balancing machine, which is provided with means for indicating distortions of the part at various points resulting from centrifugal forces of the unbalanced masses in the part during rotation at the operating speeds. To set the part up in the balancing machine, it is necessary to line it up with the center line of rotation of the machine before making the test run.

Various methods and means have been used for properly mounting the part to be tested in the balancing machine, which take a considerable amount of time and care and require skillful help and special attachments for the various sizes of shaft portions of the many different parts that it may be desired to test on one machine.

The object of the present invention is to simplify the process of lining up and attaching the part to be tested to the driving means in the balancing machine, and reduce the time and skill required, while maintaining accuracy of results.

This is made possible by the use of a universal balanced chuck mounted on the drive means of the machine, and centering pedestals with centering gauge and measuring stick.

In the drawings:

Fig. 1 shows a balancing machine in outline, with the improved parts in place.

Fig. 2 is a sectional view taken at 2—2 in Fig. 1.

Fig. 2a is a plan view of the measuring stick.

The arrangement of a balancing machine with the improvements of the present invention is shown in Figs. 1 and 2. The machine is equipped with a type centering device assembly A, a radius gauge assembly B and a chucking arrangement, assembly C.

These improvements are shown in separate views in Figs. 1 to 5 in order to more clearly illustrate the purpose of the different parts.

Figure 5:
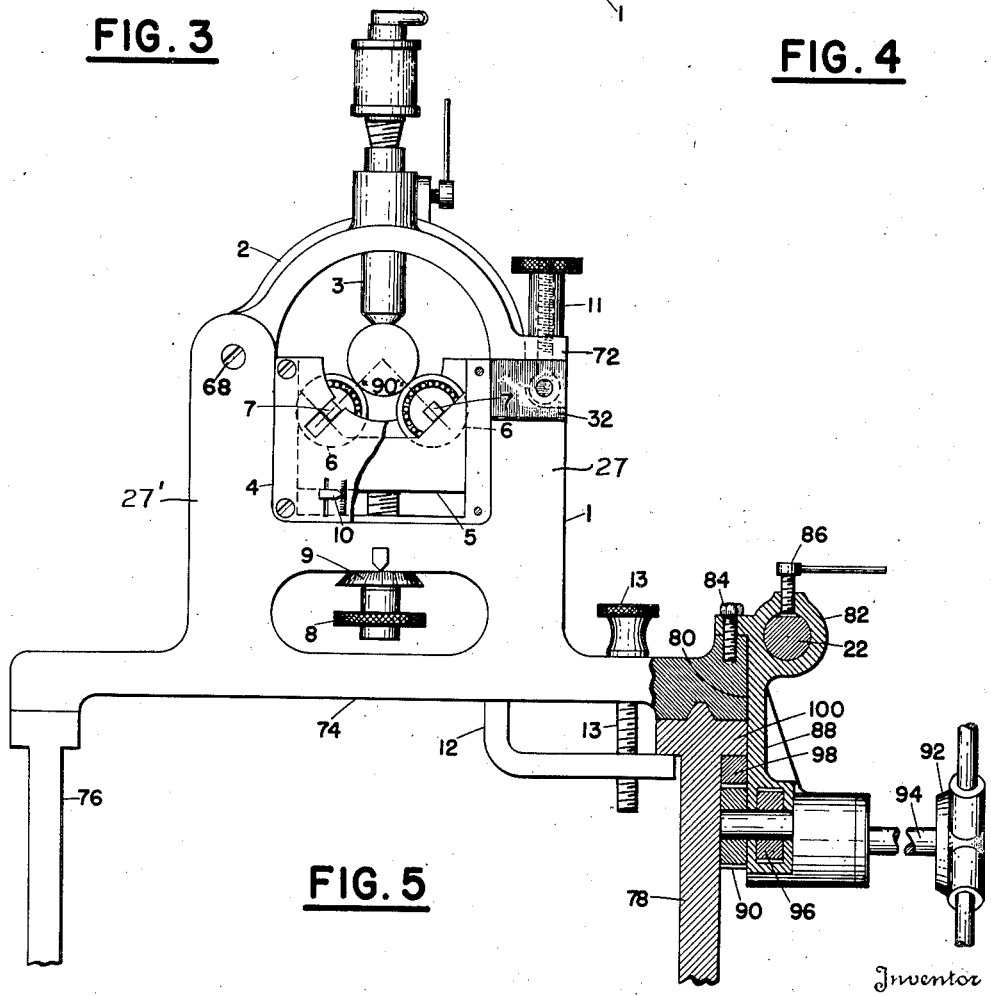
Fig. 5 is an elevational view, partly in section, showing one of the pedestals mounted on the rails of the balancing machine, means of clamping the pedestal in position and means of moving it along the rails.

Fig. 5 shows one of the centering devices for locating work on the centerline of the machine. These devices are axially adjustable along the bed of the machine and are clamped in any adjusted position by the clamping means 12 and 13. With this design the operator may by turning a micrometer screw 8 position his work concentrically with the driving center of the machine. With the pedestal latch 2 in open position, the work to be tested for balance is located on ball bearing rollers 6. The ball bearing pins 7, are squared on the ends, guided in slots machined in roller guide plates 4, and supported on inclined surfaces of the elevating block 5. The slots in roller guide plates 4 are so machined that they form a 90° angle having its vertex at top on driving center of the machine and being bisected by the vertical plane through the driving centerline of the machine. The inclined surfaces of the elevating block 5 are machined at 90° angles with the slots in roller guide plates 4. These roller guide plates 4 are fitted and held firmly by screws to pedestals 1. The elevating block 5 is enclosed and guided on the sides by roller guide plates 4 and on the ends by pedestal 1 and is elevated by micrometer screw 8. Any upward motion of the elevating block 5 forces the rollers 6 in the same direction but on 45° centerlines going through the vertical center plane of the machine. The rollers 6, being located symmetrically about the machine driving center and opposed in operating directions, elevate the work on the vertical centerline of the machine. As above stated the elevation of the work is controlled by micrometer screw 8, the ratio of travel being determined as follows:

$$\frac{\text{Roller travel}}{\text{Elev. block travel}} = \frac{1}{\cos 45°} = \frac{1}{.70711}$$

or elevating block travel = roller travel × .70711.

The indicators 9 and 10 show on appropriate scales the vernier and main readings respectively, of the distance of the rollers from the machine center line.

Figures 3, 4:
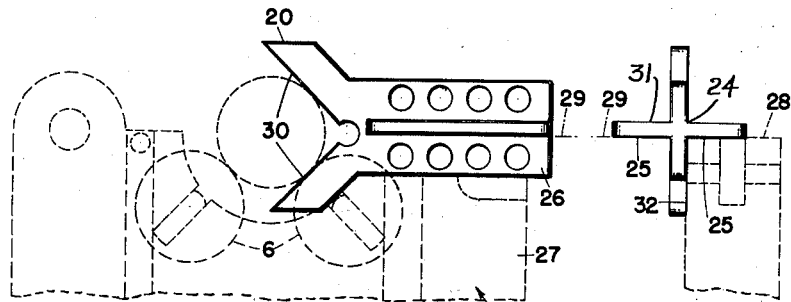
Figs. 3 and 4 show two views of the centering gauge placed in position on the pedestal for determining the proper level of the work inserted over the rollers of the pedestal.

A check on the concentricity of the work may be made with centering gauge 20, shown in Figs. 3 and 4. This gauge is formed primarily of the cross bar 24 having a finished surface 25 on the underside of the horizontal portion and on both sides of the lower half 26 of the vertical portion, so that it may be slid over a corner of the upper half 32 of the pedestal upright 27 which has a finished surface 28 at the horizontal centerline plane 29 of the machine. At one end of the cross bar the vertical section is extended and spread out in the form of a V, having finished sides 30 at right angles to each other and symmetrically arranged in respect to the horizontal finished surfaces. The upper surface 31 of the horizontal portion is stamped "Up" so as to assure the proper position of the gauge on the pedestal.

With the work in a concentric position the pedestal latch 2 is closed, the clamping unit 11 tightened in place, and the steady pin 3 adjusted. The work may now be tested for balance.

The above described centering devices comprise at least two pedestal bearings, as shown generally at 1, which are provided with pedestal uprights 27' and 27 to the former of which latch member 2 is hingedly connected as at 68. This latch member is adapted to be held in closed position by means of threaded screw 11 which is pivotally mounted in upright 27 and is adapted to bear on bifurcated foot 72 of latch member 2. The axis of rotation through the chuck of the machine is horizontal. The top surface 28 of pedestal upright 27 is finished and is positioned to lie in the horizontal plane of the above described axis of rotation. The upper portions of the axially facing surfaces of upright 27 are finished as at 32 in a plane at right angles to the axis of rotation and also in a vertical plane at right angles to top surface 28. Either of these surfaces 32 functions in conjunction with surface 28 as a reference surface in the positioning of center gauge 20.

Base plate 74 of pedestal bearing 1 is adapted to rest on and be guided by side rails 76 and 78 of the machine. As above mentioned, base plate 74 is adapted to be clamped to and held in fixed position on side rail 78 by means of clamp 12 in cooperation with threaded screw 13.

Extending upwardly and outwardly from end 80 of the base plate 74 of each pedestal is bearing 82 in the form of a bracket. This bearing is attached to base plate 74 by means of conventional machine screws 84. These bearings are adapted to support pedestal shaft 22 which extends through and between them. The upper part of shaft 22 is cut away to form a flat surface which is graduated into an inch scale. The pedestal bearings are thereby adapted to be placed at a predetermined distance apart and to be held at that distance by set screws 86 which threadedly engage bearings 82 and bear upon the flat surface of pedestal shaft 22. The function of the latter is therefore to hold the pedestal bearings in predetermined relationship to each other and to support radius gauge assembly B.

Extending downwardly from end 80 of base plate 74 and to the outside of side rail 78 is an arm 88 of bearing 82. This arm is adapted to support pinion 90 and driving means therefore comprising hand wheel 92, shaft 94 and pinion 96, which in turn is driven by a third pinion (not shown) on shaft 94. Pinion 90 is adapted to engage rack 98 which is attached to the underside of head 100 of side rail 78. By means of this rack and pinion drive, the pedestal bearings, upon being released from clamping to side rail 78 by screws 13, can be moved in unison along side rails 76 and 78 of the machine or moved independently of each other by releasing the appropriate set screws 13 and 86.

Assembly B, Figs. 1 and 2, shows an attachment designed for the purpose of conveniently locating an unbalanced correction on the work being tested. The attachment, assembly B, is located on the pedestal shaft 22 and may be moved either to the left or the right of the zero mark of the machine (see Fig. 1) and the relative distance in inches determined from graduations 23 on the machine. At the same time the radius of the work corresponding to the axial readings may be taken with measuring stick 14. The measuring stick 14 may also be swung in a horizontal plane about the vertical center of its post 15.

When in use assembly B is swung up to the position as shown in Fig. 2 in which position arm 16 of the assembly B rests against side rail 78 and prevents the movement of post 15 beyond a vertical position inwardly of the machine. When the gauge is not in use the whole assembly is swung down around the pedestal shaft 22 and out of operating position.

It has been customary to supply a limited number of sizes of gauges and bushings with a machine, and if work of other sizes was to be handled additional gauges and bushings had to be made. In the present arrangement only one gauge is necessary and the universal chuck obviates the necessity of the variety of bushings.

The use of the pedestal with the novel centering gauge makes it possible to set up a test piece in less than five minutes, thereby greatly expediting the work and at the same time eliminating the necessity of using various parts and pieces such as a test shaft, shaft size gauges and wrenches, etc.

The centering gauge is made of brass and is chromium-plated thus eliminating any possibility of false attraction. Its angles of contact with the work to be centered is such that it is possible to center the same to within two one thousandths of an inch.

The devices constituting this invention may be used by or for the Government of the United States of America for governmental purposes, without the payment to me of any royalties thereon or therefor.

I claim:

A gauge of cross-bar formation adapted to indicate the altitudinal position of the longitudinal axis of a cylindrical body supported for rotation in a vertically adjustable pedestal bearing, with respect to a fixed horizontal axis of rotation through said bearing, the said bearing being provided with reference surfaces, one lying in the horizontal plane of the fixed axis of rotation through the pedestal bearing, another surface perpendicular to the one surface and lying in a plane perpendicular to said axis of rotation, comprising two elongated members intersecting each other, medially, at right angles along a longitudinal center line extending symmetrically through the intersecting portion of the two members, a finished surface on the underside of one member lying in a plane parallel to said center line, finished surfaces on both sides of the other member lying in planes parallel to said center line and at right angles to the finished surface on the underside of the one member and a V shaped jaw so positioned in one end of the other member that when the said other member is in vertical position with respect to a horizontal plane extending lengthwise of said member, the horizontal plane bisecting the V-shaped jaw and passing through the apex thereof lies in the plane of the finished surface on the underside of the one member, whereby when the finished surface on the underside of the one member and the finished surface on the side of the other member are brought into coincidence with the horizontal and vertical reference surfaces on the pedestal bearing, respectively, and the V-shaped jaw is brought into contact with the cylindrical body supported by the bearing, the altitudinal position of the axis of rotation of said body with respect to the fixed axis of rotation through said bearing is indicated.

HERBERT E. KRUEGER.

REFERENCES CITED

The following references are of record in the file of this patent:

UNITED STATES PATENTS

| Number | Name | Date |
|---|---|---|
| 69,373 | Taylor et al. | Oct. 1, 1867 |
| 313,447 | Putnam | Mar. 30, 1885 |
| 327,343 | Stevens | Sept. 29, 1885 |
| 717,332 | Briggs | Dec. 30, 1902 |
| 737,560 | Nunnally | Aug. 25, 1903 |
| 773,957 | Masterman | Nov. 1, 1904 |
| 843,970 | Stancil et al. | Feb. 12, 1907 |
| 874,267 | Wagner | Dec. 11, 1907 |
| 889,999 | Wilcox | June 9, 1908 |
| 982,629 | Norton | Jan. 24, 1911 |
| 1,224,836 | Blainer | May 1, 1917 |
| 1,229,843 | Whitaker | June 12, 1917 |
| 1,377,663 | Brown | May 10, 1921 |
| 1,378,253 | McConnell et al. | May 17, 1921 |
| 1,429,606 | Marsland | Sept. 19, 1922 |
| 1,477,257 | Fritz | Dec. 11, 1923 |
| 1,486,115 | Allen | Mar. 11, 1924 |
| 1,510,819 | Barth | Oct. 7, 1924 |
| 1,523,959 | Hanson | Jan. 20, 1925 |
| 1,524,323 | Thomas | Jan. 27, 1925 |
| 1,599,479 | Lowry | Sept. 14, 1926 |
| 1,658,530 | Kirner | Feb. 7, 1928 |
| 1,686,318 | Gallasch | Oct. 2, 1928 |
| 1,739,106 | Trumpler | Dec. 10, 1929 |
| 1,761,945 | Van De Grift | June 3, 1930 |
| 1,765,624 | Scusa | June 24, 1930 |
| 1,876,524 | Thearle | Sept. 6, 1932 |
| 1,977,297 | Weaver | Oct. 16, 1934 |
| 2,123,443 | Taylor | July 12, 1938 |

FOREIGN PATENTS

| Number | Country | Date |
|---|---|---|
| 624,123 | Germany | of 1936 |